United States Patent [19]

Giorgi et al.

[11] 3,961,897

[45] June 8, 1976

[54] GETTER PUMP

[75] Inventors: Tiziano A. Giorgi; Stephen John Hellier, both of Milan, Italy

[73] Assignee: S.A.E.S. Getters S.p.A., Milan, Italy

[22] Filed: Aug. 30, 1974

[21] Appl. No.: 502,092

[30] Foreign Application Priority Data

Oct. 1, 1973 Italy ................................ 29588/73

[52] U.S. Cl. ................................ 23/252 R; 55/208; 55/387; 417/49; 417/51

[51] Int. Cl.[2] ....................... B01J 1/22; F04B 37/04; F04B 37/06; F04F 11/00

[58] Field of Search .......................... 417/48, 51, 49; 313/174, 176; 23/252 R; 55/208, 387

[56] References Cited

UNITED STATES PATENTS

| | | | |
|---|---|---|---|
| 3,133,224 | 5/1964 | Reid | 313/176 X |
| 3,385,420 | 5/1968 | Della Porta | 417/48 |
| 3,602,062 | 9/1971 | Zucchinelli | 417/48 |
| 3,603,704 | 9/1971 | Zucchinelli | 417/51 |
| 3,609,064 | 9/1971 | Giorgi et al. | 417/51 |
| 3,662,522 | 5/1972 | Della Porta et al. | 55/387 |
| 3,780,501 | 12/1973 | Della Porta et al. | 417/51 X |

*Primary Examiner*—Morris O. Wolk
*Assistant Examiner*—Michael S. Marcus
*Attorney, Agent, or Firm*—Littlepage, Quaintance, Murphy & Dobyns

[57] ABSTRACT

A getter pump comprising two getter elements wherein the first getter element comprises a metallic substrate having a nonevaporable getter metal embedded therein. The second getter element employs a getter metal having a lower hydrogen equilibrium vapor pressure than that of the first getter element.

14 Claims, 6 Drawing Figures

GETTER PUMP

Getter pumps are well known in the art for producing and maintaining vacuum within closed vessels. The simplest type of getter pump is simply a body of zirconium as described, for example, in de Boer U.S. Pat. No. 2,203,896 (1937). See also Beers U.S. Pat. No. 2,469,626; Denton U.S. Pat. No. 2,984,314 and more recently, Griessel U.S. Pat. No. 3,167,678.

However, more recently, getter pumps employing a particulate nonevaporable getter metal particles embedded in a substrate, have found wide acceptance. Such getter pumps are described, for example, in della Porta U.S. application Ser. No. 197,819 and corresponding Italian Pat. No. 877,155; Zucchinelli et al U.S. Pat. No. 3,603,704; Zucchinelli et al U.S. Pat. No. 3,609,062; Giorgi et al U.S. Pat. No. 3,609,064; della Porta et al U.S. Pat. No. 3,662,522; and Young U.S. Pat. 3,672,789. These latter described getter pumps employing a nonevaporable getter metal embedded in a substrate can be employed to pump hydrocarbons such as methane when these getter pumps are employed in combination with means for cracking the methane into carbon and hydrogen. The pumping of methane is described, for example, by Young supra. See also Proceedings of the Fourth International Vacuum Congress 1968 article by della Porta, entitled, "Magnetless Gauge Appendage Pump Utilizing Nonevaporable Getter Material," published by the Institute of Physics and the Physical Society, 47 Belgrave Square, London SW1, pages 369–372. However, getter pumps employing a nonevaporable getter metal embedded in a substrate have a common problem when pumping methane or other hydrocarbons. That problem is the undesirable loss of particles from the substrate. Loose particles manifest themselves when a large amount of hydrogen has been sorbed by the getter metal such that charges of the crystal lattice dimensions occur. The change of dimensions tends to dislodge the particles of getter metal from their original position. Another problem is the undesirably low quantities of methane that are pumped by the above described getter pumps.

Accordingly, it is an object of the present invention to provide an improved getter pump substantially free of one or more of the disadvantages of prior getter pumps.

Anothr object is to provide an improved getter pump free of the particle loss problem when pumping methane.

Yet another object is to provide an improved getter pump which has a greater capacity for the pumping of methane than prior pumps.

According to the present invention, the above and other objects are accomplished by providing a getter pump employing two getter elements. The first getter element comprises a metallic substrate and a nonevaporable getter metal in the form of particles embedded in the substrate as is characteristic of prior getter pumps. However, the getter pumps of the present invention are provided with a second getter element, the getter metal of which has a lower equilibrium hydrogen vapor pressure than the equilibrium hydrogen vapor pressure of the getter metal of the first getter element. It will be appreciated that the value of the equilibrium hydrogen vapor pressure above a getter metal depends upon the temperature of the getter metal and also upon the concentration of hydrogen within the getter metal. The hydrogen equilibrium vapor pressure is measured when the getter elements have sorbed equal quantities of hydrogen. Furthermore, according to the present invention, the getter metal in the second getter element must be in the form of a cohesive mass.

According to a preferred embodiment of the present invention, there is provided a getter pump comprising a high temperature getter element, a low temperature getter element, means for maintaining the high temperature getter element at a temperature of 300° to 800°C and preferably 350° to 700°C, means for maintaining the low temperature getter element at a temperature of 20° to 400°C and preferably 50° to 300°C, means for maintaining a temperature differential of at least 50°C between the low temperature getter element and the high temperature getter element, and means for cracking the hydrocarbons. In this embodiment, the high temperature getter element comprises a metallic substrate having nonevaporable getter metal in the form of particles embedded in the substrate.

Specific embodiments of getter pumps of the present invention are shown in the drawings wherein.

The non-evaporable getter metals useful in the present invention are characterized by a sorptive capacity for active gases and by a vapor pressure of less than $10^{-5}$ torr when measured at 1000°C. Examples of suitable non-evaporable getter metals include among others, zirconium, titanium, tantalum and niobium. These non-evaporable getter metals can be employed in their pure form or as alloys with one another or with other metals that do not materially reduce their sorptive capacities. A preferred subclass of non-evaporable getter metals useful in the present invention are the zirconium-aluminum alloys. The most preferred zirconium-aluminum alloy is an alloy of 84 weight percent zirconium, balance aluminum available from SAES Getters S.p.A., Milan, Italy, under the trademark St 101. The non-evaporable getter metals, when employed as particles generally pass through a US standard screen of 10 mesh per inch and preferably pass through a screen of 100 mesh per inch.

In the case of the low temperature getter element, the non-evaporable getter metal is employed in the form of a cohesive mass. Any type of cohesive mass is sufficient within the broadest aspects of the present invention. For example, the cohesive mass can simply be a block of the getter metal as employed in de Boer supra. However, the cohesive mass is preferably employed in the form of a compressed, or sintered agglomeration of particles of non-evaporable getter metal.

According to that aspect of the present invention wherein the getter elements have different temperatures, there is provided means for maintaining a temperature differential of at least 50, and preferably at least 100°C, between the temperature of the low temperature getter element and the temperature of the high temperature getter element. This temperature differential can be accomplished in a number of ways.

For example, different amounts of current can be passed through heating elements associated with the high and the low temperature getter elements. Alternatively, a single heating element can be employed with the low temperature getter element positioned at a further distance from the heater than the high temperature getter element.

In a preferred embodiment of the present invention a greater quantity of getter metal is employed in the low temperature getter element than is employed in the high temperature getter element. The weight ratio of the getter metal in the low temperature getter element to the getter metal in the high temperature getter element is generally at least 1:2 and preferably at least 3:1 and ideally 3:1 to 50:1. At lower ratios, the total methane pumping capacity of the getter pump is adversely affected, whereas at higher ratios the capacity can be maintained more conveniently by means of suitably adjusting the operating temperature of a lower ratio device.

Figure 1:
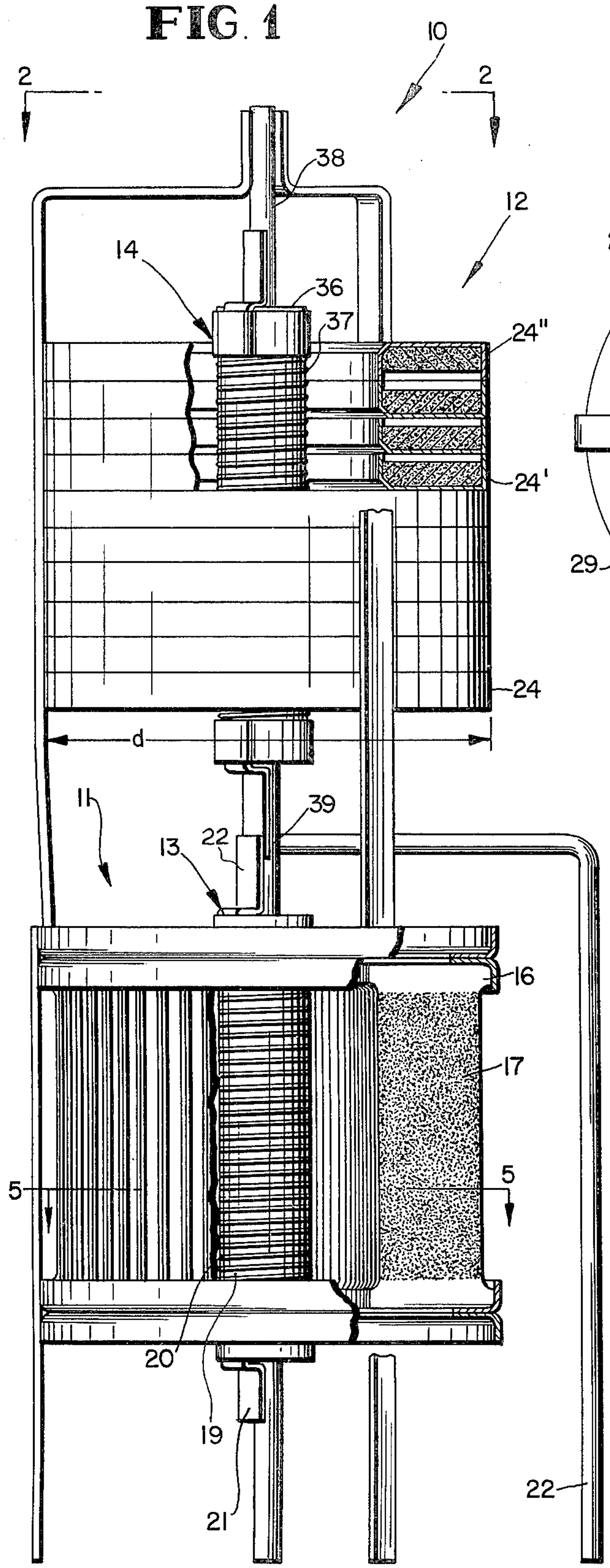
FIG. 1 is a sectional view of a getter pump of the present invention.
Figure 2:
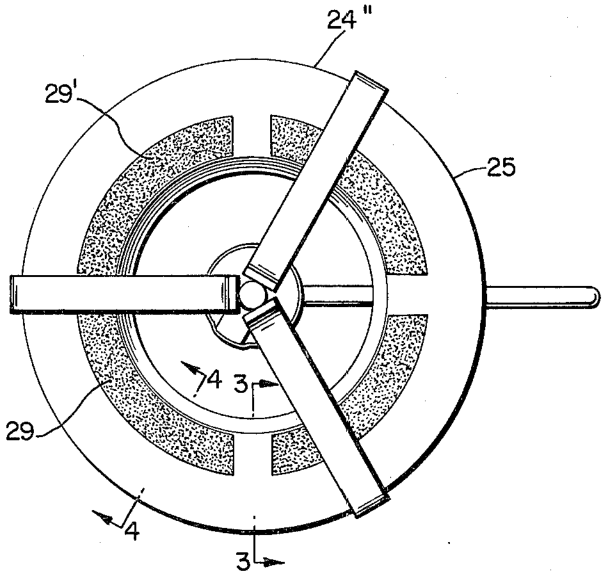
FIG. 2 is a top view taken along line 2—2 of FIG. 1.
Figure 5:
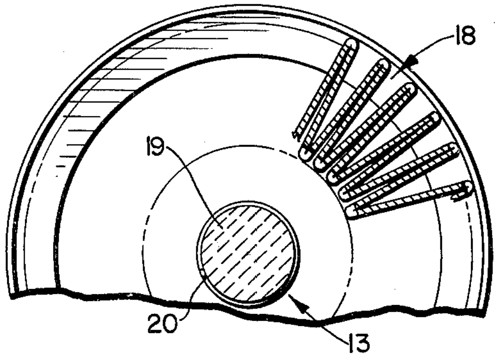
FIG. 5 is a partial sectional view taken along line 5—5 of FIG. 1.

Referring now to the drawings, and in particular to FIG. 1, there is shown a getter pump 10 of the present invention. The getter pump 10 comprises a high temperature getter element 11, a low temperature getter element 12, a heater 13 for the high temperature getter element 11, and a heater 14 for the low temperature getter element 12. The high temperature getter element comprises a substrate 16, having non-evaporable getter metal in the form of particles 17 embedded in the substrate 16. In the embodiment shown, the substrate 16 is softer than the particles 17. Furthermore, the substrate 16 and the particles 17 are free of organic binding agents. The particles 17 can be of widely varying size, but are generally those that pass through a U.S. standard screen of 100 mesh per inch. The substrate 16 is in the form of a thin planar strip bent at evenly spaced intervals in opposite directions to form a pleated structure in the form of a ring 18 as shown in FIG. 5. The heater 13 constitutes means for maintaining the high temperature getter element 11 at a temperature of 300° to 800°C. The heater 13 comprises a ceramic insulator 19 positioned co-axially with respect to the ring 18. The heater 13 is provided with a wire 20 of high electrical resistance. The heater 13 has terminals 21 and 22 which can be connected to a source of electrical potential not shown.

In the high temperature getter element 11, the wire 20 is adapted to be maintained at a temperature of at least 700°, and preferably at least 1200°C, in order to crack hydrocarbons such as methane into carbon and hydrogen.

Figure 4:
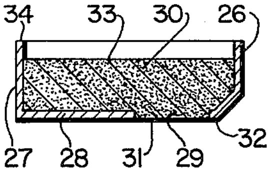
FIG. 4 is a sectional view taken along line 4—4 of FIG. 2.
Figure 3:
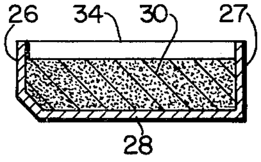
FIG. 3 is a sectional view taken along line 3—3 of FIG. 2.

The low temperature getter element 12 comprises a plurality of segments such as the lower segment 24, a representative intermediate segment 24', and an upper segment 24''. The segments 24, 24', 24'' are identical. The upper segment 24'' is representative and comprises an annular ring 25 having an inner wall 26 as shown in FIGS. 3 and 4 and an outer wall 27. A lower wall 28 joins the inner wall 26 and the outer wall 27. The lower wall 28 is provided with a plurality of passages 29, 29'. A cohesive mass 30 of particles of a non-evaporable getter metal fills the space defined by the inner wall 26, the outer wall 27, and the lower wall 28. Furthermore, the particles fill the passages 29, 29' through the lower wall 28. The lower surface 31 of the particles is substantially co-extensive with the lower surface 32 of the lower wall 28. The upper surface 33 of the particles is lower than the upper extremity 34 of the annular ring 25.

The heater 14 is similar in construction to the heater 13 and comprises a ceramic insulator 36 and a wire 37 of high electrical resistance. In the embodiment shown, the wire 37 is grounded onto the post 38 whereas the other terminal of the wire 37 is the point 39 which is common with the wire 20 of the heater 13.

In a specific example, the annular ring 24 has an outside diameter, *d*, of 1.9cm. There are ten such rings containing a total of about 12.5 grams of non-evaporable getter metal. The non-evaporable getter metal employed in St 101 alloy. The high temperature getter element 11 is that provided by SAES Getters S.p.A. as St 101 getter strip and contains about 1.6 grams of St 101 alloy.

In operation, the getter pump 10 is placed into a closed vessel containing a quantity of methane. The majority of the methane and other gases are removed by mechanical means until the pressure in the vessel drops to less than $10^{-2}$ torr whereupon current is passed through the heaters 13 and 14 such that the cohesive mass 30 of getter metal is raised to a temperature of 900°C and the getter element 12 is raised to a temperature of 750°C, both for 15 minutes, in order to activate them as is well known in the art. Thereafter, the current flowing through the heaters 13 and 14 is adjusted so that the temperature of the low temperature getter element 12 is maintained at 200°C whereas the temperature of the high temperature getter element 11 is maintained at 400°C. The actual temperature of the wire 20 of the heater 13 is 1500°C and is effective to crack methane. The getter pump 10 effectively sorbs methane with no loss of particles 17 from the substrate 16.

Figure 6:
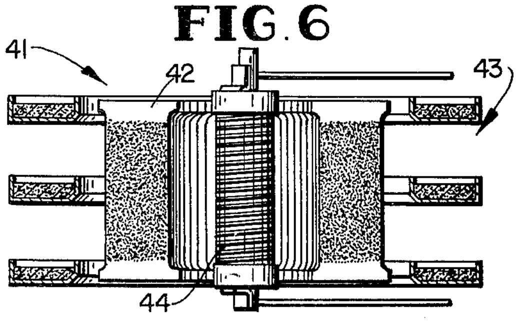
FIG. 6 is a schematic representation of another embodiment of the getter pumps of the present invention.

FIG. 6 shows an alternative embodiment of the present invention in the form of a getter pump 41. The getter pump 41 has a high temperature getter element 42, a low temperature getter element 42, and a single resistance heater 44. The high temperature getter element 42 is spaced co-axially with respect to the low temperature getter element 43 and the heater 44. Because the low temperature getter element 43 is further away from the heater 44 than is the high temperature getter element 42, the latter has a lower temperature than the former. Thus it can be seen that the heater 44 constitutes means for maintaining the high temperature getter element 42 and the low temperature getter element 43 within their desired temperature ranges and also provides means for cracking the hydrocarbons. Low temperature getter element 43 may be activated by radiofrequency heating if desired.

EXAMPLE

A getter pump was constructed similar in all respects to getter pump 10 described above. The getter pump was activated in vacuum with the temperature and time again as described above. Methane was admitted to the getter pump at a pressure of $10^{-3}$ torr until the pump had sorbed 0.5 litre-torr of methane. Hydrogen was then admitted to the getter pump at a pressure of $5\times10^{-4}$ torr until the pump had sorbed 10 litre-torr of hydrogen. The gas sorption tests were repeated until the pump had sorbed a total of 5 litre torr methane and 100 litre-torr hydrogen. The getter pump showed no signs of loose particles and no sign of exhaustion.

Although the invention has been described in considerable detail with reference to certain preferred embodiments thereof, it will be understood that variations and modifications can be effected within the spirit and scope of the invention as described above and as defined in the appended claims.

What is claimed is:

1. A getter pump useful for pumping hydrocarbons comprising:
  A. a high temperature getter element comprising:
    1. a metallic substrate,
    2. non-evaporable getter metal in the form of particles embedded in the substrate,
  B. means for maintaining the high temperature getter element at a temperature of 350° to 700°C,
  C. a low temperature getter element comprising a cohesive mass of non-evaporable getter metal, said low temperature getter element being attached to and in flow communication with said high temperature getter element, said getter elements being carried by a common frame and forming a single unit
  D. means for maintaining the low temperature getter element at a temperature of 50° to 300°C,
  E. means for maintaining a temperature differential of at least 100°C between the low temperature getter element and the high temperature getter element,
  F. means for cracking the hydrocarbons,
    wherein the weight ratio of the getter metal of the low temperature getter element to the getter metal of the high temperature getter element is at least 1:2.

2. A getter pump useful for pumping hydrocarbons comprising:
  A. a high temperature getter element comprising:
    1. a metallic substrate,
    2. non-evaporable getter metal in the form of particles embedded in the substrate,
  B. means for maintaining the high temperature getter element at a temperature of 300° to 800°C,
  C. a low temperature getter element comprising a cohesive mass on non-evaporable getter metal, said low temperature getter element being attached to and in flow communication with said high temperature getter element, said getter elements being carried by a common frame and forming a single unit,
  D. means for maintaining the low temperature getter element at a temperature of 20° to 400°C,
  E. means for maintaining a temperature differential of at least 50°C between the low temperature getter element and the high temperature getter element, and
  F. means for cracking the hydrocarbons.

3. The getter pump of claim 2, wherein the weight ratio of the getter metal of the low temperature getter element to the getter metal of the high temperature getter element is at least 3:1.

4. The getter pump of claim 2, wherein the means for cracking the hydrocarbons is a resistance heater adapted to be heated to a temperature greater than the thermal decomposition temperature of the hydrocarbons.

5. The getter pump of claim 2, wherein the means for maintaining the temperature of the high temperature getter element and the means for cracking the hydrocarbons constitute a single resistance heater.

6. The getter pump of claim 2, wherein the cohesive mass of non-evaporable getter metal is a mass of compressed particles.

7. The getter pump of claim 2, wherein the cohesive mass of non-evaporable getter metal comprises sintered particles of non-evaporable getter metal.

8. The getter pump of claim 2, wherein the non-evaporable getter metal in the high temperature getter element is a zirconium-aluminum alloy.

9. The getter pump of claim 8, wherein the zirconium-aluminum alloy contains 84 weight percent zirconium balance aluminum.

10. The getter pump of claim 2, wherein the non-evaporable getter metal in the low temperature getter element is a zirconium-aluminum alloy.

11. The getter pump of claim 10, wherein the zirconium-aluminum alloy contains 84 weight percent zirconium balance aluminum.

12. The getter pump of claim 2, wherein the means for maintaining the high temperature getter element at a temperature of 300° to 800°C is a resistance heater.

13. The getter pump of claim 2, wherein the means for maintaining the low temperature getter element at a temperature of 20° to 400°C is a resistance heater.

14. A getter pump having a high sorptive capacity for methane, and being free of particle loss problems, said pump comprising:
  A. a high temperature getter element comprising:
    1. a metallic substrate, and
    2. non-evaporable getter metal in the form of particles embedded in the substrate, wherein:
    3. the substrate is softer than the particles,
    4. the getter metal is an alloy of 84 weight percent zirconium, balance aluminum,
    5. the particles are of a size such that they pass through a US standard screen of 100 mesh per inch,
    6. the substrate is in the form of a thin planar strip bend at evenly spaced intervals in opposite directions to form a pleated structure,
    7. the pleated structure is ring-shaped and held within the high temperature getter element by a container,
  B. means for maintaining the high temperature getter element at a temperature of 350° to 700°C, said means comprising:
    1. a ceramic insulator positioned co-axially with respect to the ring formed of the pleated structure,
    2. a wire of high electrical resistance helically wound around the ceramic insulator,
    3. means for impressing an electrical potential across the ends of the wire, wherein:
    4. the wire is maintained at a temperature of at least 1000°C in order to crack methane into carbon and hydrogen,
  C. a low temperature getter element comprising:
    1. a lower segment comprising:
      a. an annular ring comprising:
        i. an inner wall,
        ii. an outer wall,
        iii. a lower wall joining the bottom of the inner wall and the bottom of the outer wall, the lower wall having passages therethrough,
      b. a cohesive mass of particles of a non-evaporable getter metal wherein:
        i. the particles fill the space defined by the inner wall, the outer wall and the lower wall, ii. the particles fill the passages through the lower wall, iii. the lower surface of the particles is substantially co-extensive with the lower surface of the lower wall, iv. the upper surface of the particles is lower than the upper extremity of the annular ring, v. the weight ratio of the getter metal in the low temperature getter element to the getter metal in the high temperature getter element is 3:1 to 50:1, D. means for maintaining the low temperature getter element at a temperature of 50° to 300°C, said means comprising:

1. a ceramic insulator positioned co-axially with respect to said low temperature getter element,

2. a wire of high electrical resistance helically wound around the ceramic insulator,

3. means for impressing an electrical portential across the ends of the wire, wherein said low temperature getter element is attached to and in flow communication with said high temperature getter element and said getter elements are carried by a common frame and form a single unit.

* * * * *

UNITED STATES PATENT AND TRADEMARK OFFICE

CERTIFICATE OF CORRECTION

PATENT NO. : 3,961,897

DATED : June 8, 1976

INVENTOR(S) : Tiziano A. Giorgi; Stephen John Hellier

It is certified that error appears in the above-identified patent and that said Letters Patent are hereby corrected as shown below:

[56] 3,602,062 should read --3,609,062.

Column 1, line 10, delete "a"
line 47, delete "Anothr" and insert --Another--.

Column 4, line 39, delete "42" (second occurrence) and insert --43--.

Column 4, line 13, delete "in" and insert --is--.

Column 5, line 42, delete "on" and insert --of--.

Column 6, line 39, delete "bend" and insert --bent--.

Signed and Sealed this

Twenty-sixth Day of October 1976

[SEAL]

*Attest:*

RUTH C. MASON
*Attesting Officer*

C. MARSHALL DANN
*Commissioner of Patents and Trademarks*